Nov. 18, 1947.  J. W. BRYCE  2,431,024
STATISTICAL MACHINE CONTROLLED BY COLORED PHOTOGRAPHIC FILM
Filed July 25, 1944  8 Sheets-Sheet 3

INVENTOR
James W. Bryce
BY
W. M. Wilson
ATTORNEY

Nov. 18, 1947. J. W. BRYCE 2,431,024
STATISTICAL MACHINE CONTROLLED BY COLORED PHOTOGRAPHIC FILM
Filed July 25, 1944 8 Sheets-Sheet 4

Nov. 18, 1947.　　　J. W. BRYCE　　　2,431,024
STATISTICAL MACHINE CONTROLLED BY COLORED PHOTOGRAPHIC FILM
Filed July 25, 1944　　8 Sheets-Sheet 5

INVENTOR
James W. Bryce
BY
W. M. Wilson
ATTORNEY

Nov. 18, 1947.  J. W. BRYCE  2,431,024
STATISTICAL MACHINE CONTROLLED BY COLORED PHOTOGRAPHIC FILM
Filed July 25, 1944  8 Sheets-Sheet 6

INVENTOR
JAMES W. BRYCE.
BY
ATTORNEY

Nov. 18, 1947. J. W. BRYCE 2,431,024
STATISTICAL MACHINE CONTROLLED BY COLORED PHOTOGRAPHIC FILM
Filed July 25, 1944 8 Sheets-Sheet 7

FIG. 12a.

INVENTOR
JAMES W. BRYCE
BY
ATTORNEY

Nov. 18, 1947.    J. W. BRYCE    2,431,024
STATISTICAL MACHINE CONTROLLED BY COLORED PHOTOGRAPHIC FILM
Filed July 25, 1944    8 Sheets-Sheet 8

INVENTOR
JAMES W. BRYCE.
BY
ATTORNEY

Patented Nov. 18, 1947

2,431,024

UNITED STATES PATENT OFFICE 2,431,024

STATISTICAL MACHINE CONTROLLED BY COLORED PHOTOGRAPHIC FILM

James W. Bryce, Glen Ridge, N. J., assignor to International Business Machines Corporation, New York, N. Y., a corporation of New York Application July 25, 1944, Serial No. 546,468
In Great Britain June 12, 1940

7 Claims. (Cl. 235—61.7)

This invention relates to improvements in statistical machines and, more particularly, to improvements in such machines which are controlled by light modifying control elements such as photographic control records. The present application constitutes a continuation-in-part of copending application Serial No. 410,728, filed September 13, 1941, which is a continuation-in-part of an application Serial No. 282,207, filed June 30, 1939. The machine described in the present application also constitutes an improvement over the machine described in application Serial No. 282,206, filed June 30, 1939, now Patent 2,268,498.

One of the objects of the present invention is to provide means whereby the color of the data designations disposed on the control records is made effective to control the operations of the statistical machines.

Another object of the present invention is to provide means whereby selective control of entry of the data into the accumulating means is effected in dependence upon the color of data designations.

Another object of the present invention is to provide means whereby the means of the data accumulating means is controlled additively or subtractively in dependence upon the color of data designations.

Still another object is to provide means whereby certain of the data sensed on the colored photographic records is effective to control selectively the adding and subtracting functions of data accumulating means in accordance with the color of the data designations.

Still another object is to provide a machine for tabulating data stored on a control record of the type disclosed in my Patent 2,268,499 and capable of sensing both the position and color characteristics of a distinctively positioned and colored data designation and making a specific response to each of said characteristics.

To illustrate one method of attaining the objects just set forth, provision is made whereby photographic control records having distinctively colored and positioned data designations are presented successively to a single analyzing or sensing station, whereat the records are transilluminated and the data designations are sensed and effective to control or condition suitably arranged light responsive means in accordance with the color and position of the sensed designations. The colored light rays set up by the control spots or data designations are directed to a plurality of photocells by means of light conducting rods, the said photocells are provided with different color filters so that one of them is effective to absorb or block off the color rays from the associated photocell and thus condition the said photocell to render a suitable amplifying means operative for control purposes. Now, in the chosen illustration, means are provided whereby the amount data is effective to control the accumulator additively as long as the data designations are of a certain color, or certain colors; however, upon detection of a data designation of a different color, entry control means are conditioned to cause the amount to be subtractively entered in the accumulator. A data designation of still another color will cause the entry control means to be conditioned to prevent the entry of the amount in the accumulator. The data designation used for color control may be one representing, by its position, a class number, or one digit of a class number, which may exercise an automatic group control function. On the other hand, it may be one representing, by its position, one of the amount digits. Since all of the data designations of an individual record are preferably of the same color, any one may be used for the color control. By using for entry control different colors of data designations, which also represent class numbers or amount values (for example) by their positions, special entry control designations can be dispensed with.

Other objects of the invention will be pointed out in the following description and claims and illustrated in the accompanying drawings, which disclose, by way of example, the principle of the invention and the best mode, which has been contemplated, of applying that principle.

2,431,024

Before describing the operation of the improved statistical machine, which forms the subject matter of the instant application, the photographic control record and the method of analyzing the colored data designations disposed thereon will be described first, followed by a description of the different control units utilized in the said machine.

Photographic control records

Figures 1, 2:
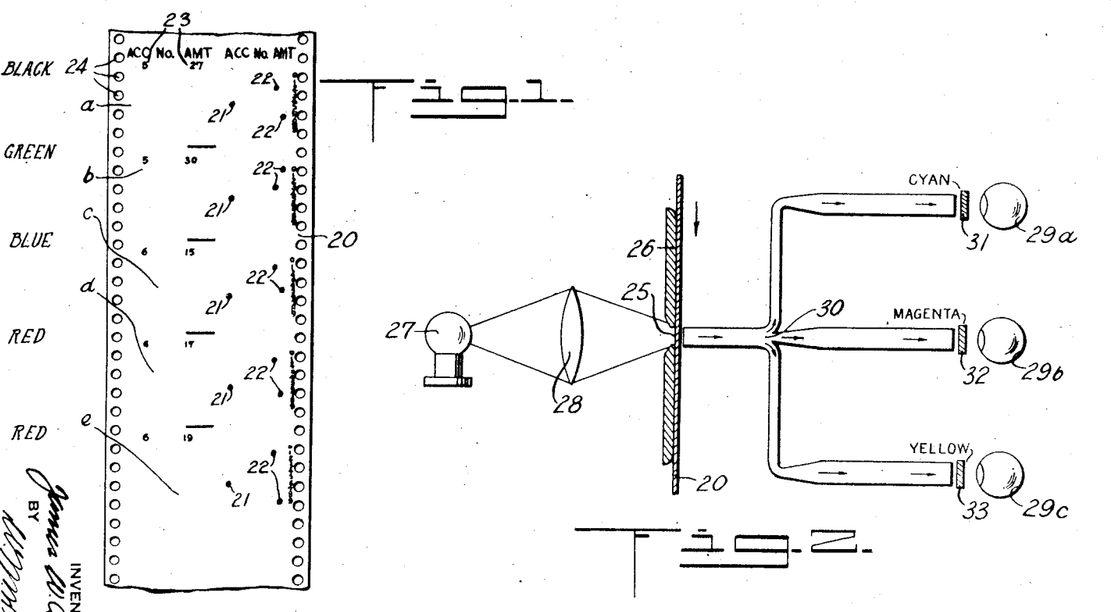
Fig. 1 is a portion of the machine control element.
Fig. 2 is a diagrammatic view of the record analyzer.

Referring now to Fig. 1, the photographic control element 20 shown therein is a fragmentary section of a continuous strip of photographic color film, provided with the usual feed apertures 24, upon which film are formed a plurality of individual records "a" to "e" comprising groups of data designations 21 and 22 in the form of discrete, distinctively positioned, and differently colored control spots or data designations. One type of color film which is suitable for the purposes described in the instant application is the "Agfacolor" film which comprises a single unitary film structure consisting of a support upon which are coated in thin superimposed layers a plurality of light sensitive emulsions, each particularly sensitive to one of the primary colors. By exposing such a film to a colored object, three separate color records are recorded simultaneously, each sensitized layer recording the image to which it is color-sensitive. The color formation is brought about by the development of the film. Assume that the film 20 has been suitably exposed to record the data thereon in color and that the color formation of the data as designated is brought out by development of the recorded film.

The spot representations 21 represent suitable classification data and the spot representations 22 represent amount data. The data represented by the reference character 23 is shown merely for interpreting the associated coded control spots and is not used for controlling machine operations. Assume that the data shown in the individual records a, b, c, d, and e are, respectively, in black, green, blue, red, and red, as indicated in Fig. 1.

The spot representations 21 and 22 are photographic machine control spot representations and each set of numerical data comprises one or more control spots in such relative position, in different columnar areas, upon the film record as to represent by their relative position thereon the numerical control value thereof. In practice and according to the embodiment shown, such numerical spot representations are shown on the film in index point relation in general conformance with the manner in which index perforations are disposed on perforated record cards in the Hollerith accounting system. That is, the differential position of a control spot representation delineates the numerical value of a particular numeral. This will be clear by referring to Fig. 1 and particularly record "a" wherein the data represented by the designations or control spots 22 represent the amount twenty-seven.

It will be understood that the completed film has photographic reproductions thereon at successively spaced intervals along the film and that the reproductions are in extremely compact form, accordingly, a large quantity of statistical information can be placed on an extremely small controlling record.

Method of analyzing color of data designations

Referring now to Fig. 2, the method of analyzing the colored control spots formed on the film will be explained briefly. Assume that the film 20 is advanced in the direction shown by the arrow past the sensing station which is represented by an aperture 25 in the opaque member 26, and that the color of the control spot presented to the said sensing station is red. Light rays emanating from a suitable source 27 are directed by the condenser 28 to the aperture 25 to permeate the section of the film presented to the said aperture. The red rays transmitted by the control spot are directed to different photocells 29a, 29b and 29c by means of the light conducting means comprising a three-way quartz rod member 30. Suitable light ray filters 31 to 33 are disposed between the individual legs of the quartz rod member and the associated photocells. Assume that the filter 31 is a cyan color filter designed to pass the different colored rays excepting red rays which are absorbed by this filter, that the filter 32 is a magenta color filter permitting the colored rays with the exception of green to pass therethrough, and that the filter 33 is a yellow color filter permitting the colored rays with the exception of blue to pass therethrough.

Now, since the red light rays are directed by the individual legs of the quartz member 30 to the individual filters 31 to 33, the said rays are permitted to pass through the magenta and yellow filters to impinge upon the associated photocells 29b and 29c respectively, but are absorbed by the cyan filter so that no light rays are transmitted to the associated photocell 29a. Upon presentation of a blue control spot to the sensing station, the cyan and magenta filters permit the rays to be transmitted to photocells 29a and 29b respectively, whereas no blue light rays are transmitted by the yellow filter to the photocell 29c, and upon sensing a green control spot light rays are transmitted to photocells 29a and 29c but not to photocell 29b. In the event that a black control spot is presented to the sensing station, no light rays are transmitted to any of the three photocells, namely 29a to 29c.

Suitable amplifiers 34 are connected to the said photocells 29a to 29c (see Fig. 12a) in a manner well known in the art so that it is considered necessary only to state that when light rays of any color are impinging on the photocells the associated amplifiers are conditioned so that no current flows in their output circuits whereas, when no light rays are transmitted to the photocells, the associated amplifiers are conditioned so that current flows in the output circuits thereof as long as the light rays do not impinge thereon. The purpose of this arrangement will be understood as the description progresses.

Film feeding and sensing means

Figure 3:
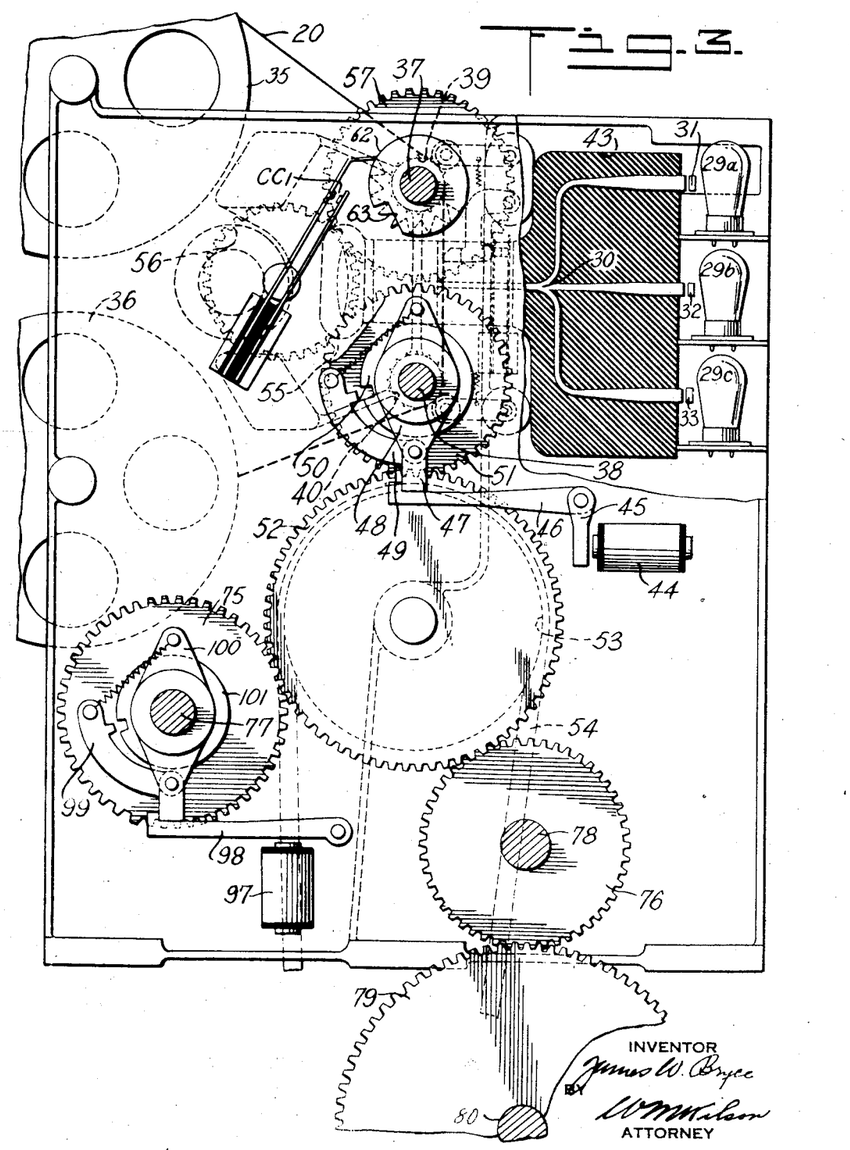
Fig. 3 is a vertical sectional view of the film feeding and analyzing means.
Figure 4:
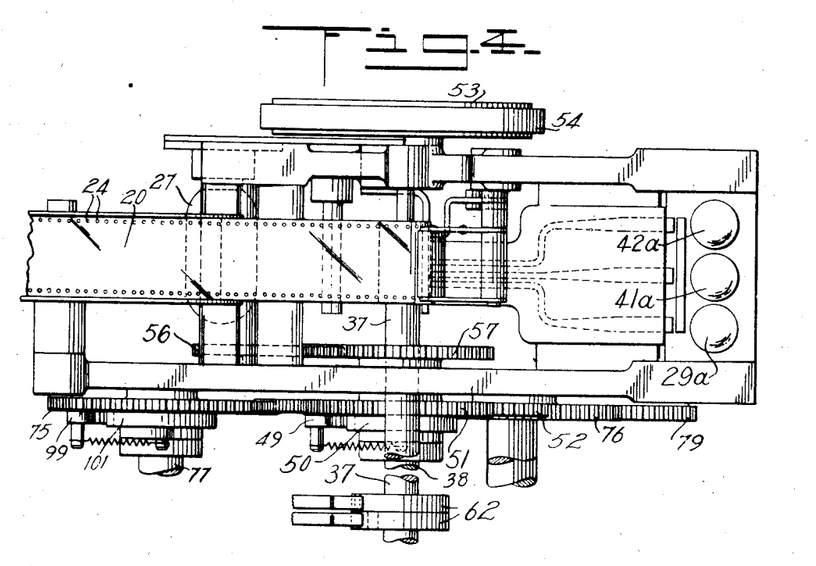
Fig. 4 is a plan view of the film feeding and analyzing means shown in Fig. 3.
Figure 5:
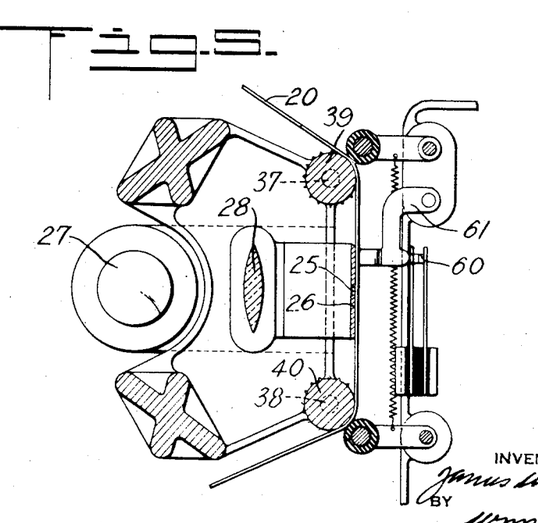
Fig. 5 is a detail view of the film feeding means.

Referring now to Figs. 3, 4 and 5, the photographic color film 20 is shown disposed on a supply spool or reel 35. The film is attached to a take-up reel 36 and may be advanced by suitable driving connections cooperating with shafts 37 and 38 by means of suitable film feeding sprockets 39 and 40 secured to the said shafts, respectively, which sprockets cooperate with the film feed apertures 24 in the film. The film is fed past the analyzing station comprising the sensing aperture 25 and trans-illuminated by the light rays emanating from the light source 27 and directed thereto by the condenser 28. The said scanning aperture is arranged to present an opening sufficient to permit the scanning of a single transverse row of data or control spots only and is provided to extend transversely across the film record to any desired extent so as to permit the desired columns on the film to be sensed. The reference characters 29a, 41a and 42a in Fig. 4 represent the plurality of vertical rows of photocells which are disposed at the analyzing station and controlled by the light rays impinging thereon. Each vertical row of photocells, in the present illustration, comprises three photocells, for example, in Fig. 3, they are designated 29a to 29c. Thus, for each columnar area on the film, three individual photocells are provided and arranged as described. For each row or order of photocells a three way light conducting member 30 is provided, said member comprises a quartz rod member having three conducting legs for transmitting the light rays from the sensing aperture 25 to the associated photocells. The said quartz members are suitably supported by the block 43 and as mentioned the legs thereof extend from each photocell to the analyzing station where the common legs are positioned adjacent to one another along the sensing aperture. The spacing of the common legs of the quartz members along the said aperture is so arranged that each leg is positioned opposite one of the columns of control spots disposed on the film. In this manner the light rays directed to the sensing aperture can be conducted to the associated photocells to condition the latter for machine control operations during the sensing operations.

As mentioned before, individual color filters 31 to 33 are interposed between the individual legs of the quartz members 30 and the associated photocells. In Fig. 3, the color filters designated 31 to 33 are the cyan, magenta and yellow color filters referred to hereinabove for the purposes set forth. The three filters are provided for each order and interposed between the legs of the quartz members and associated photocells as shown in Fig. 3.

The film feeding means and control means therefor comprise generally the clutch magnet 44 and the associated pivoted armature 45 to which is secured a latch lever 46 normally engaging an extension 47 of the member 48 secured to shaft 38, and the clutch pawl 49 pivotally supported by member 48 and normally disengaged from the clutch element 50 by means of the said latch lever. Upon energization of magnet 44, the latch lever 46 is caused to release the pawl 49 to engage the clutch element 50 which is rotatably mounted on shaft 38 and rigidly secured to gear 51 which is driven by suitable means such as the gear 52 secured to drive pulley 53, and the associated driving connection 54. Thus, it is seen that whenever the driving connections are operated and the magnet 44 energized that shaft 38 is rotated and in addition thereto gear 55, which is secured thereto, rotates gears 56 and 57, the latter being secured to shaft 37, thereby rotating said shaft and causing the respective feed sprockets 40 and 39 to feed the film to the analyzing station. The control spots disposed on the film are then effective to modify the light rays emanating from the light source as described hereinabove for controlling the conditioning of the associated photocells.

It should be mentioned that film supply control contacts 60 (Fig. 5) are provided and adapted to be closed by the suitably pivoted lever 61 as long as the film is presented to the analyzing station, however, when the film supply is exhausted the said lever swings to the left as viewed in Fig. 5 to open the contacts 60, the purpose of which will be understood as the description progresses. On shaft 37, a plurality of cams 62 are provided, similar to the one shown and designated in Fig. 3, for controlling the associated contacts CC1 to CC4 (see Figs. 12a and 12b); also on the said shaft 37, a plurality of cams 63 similar to the one shown, are provided for controlling the contacts C1 and C2 (Fig. 12a) so that the said contacts are closed only at the times the index point positions are presented to the analyzing station as indicated in the timing chart in Fig. 11.

Figure 6:
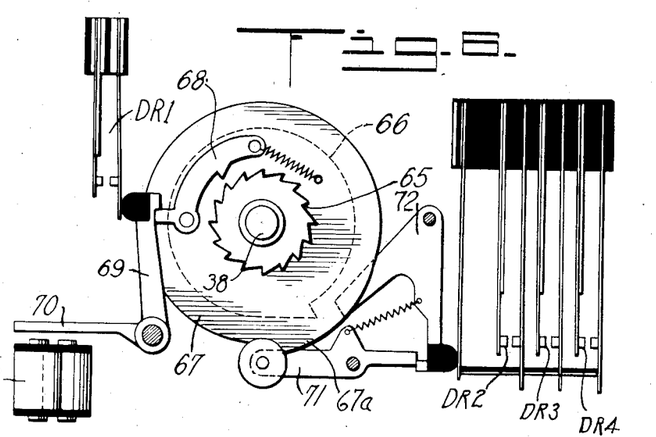
Fig. 6 is a diagrammatic view of the cam controlled contacts.
Figure 7:
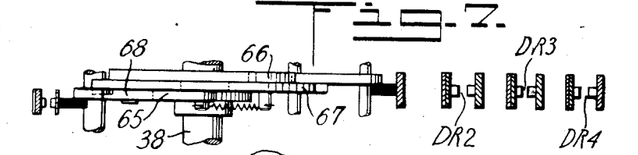
Fig. 7 is a plan view of the contact assembly shown in Fig. 6.

In addition thereto, a plurality of control devices are provided one of which will now be explained (see Figs. 6 and 7). The purpose of these devices will be understood when the operation of the machine is described. Upon the shaft 38 a ratchet member 65 and cam member 66 are securely mounted, and interposed between the said members and freely mounted on the said shaft is a cam member 67. Pivotally mounted on the cam member 67 is a pawl 68 which is normally held out of engagement with ratchet 65 by the latch lever 69 which can be an integral part of the armature 70 of the magnet DR. Upon energization of the said magnet, the pawl 68 is released to engage the rotating ratchet 65 thereby effecting rotation of cam 67. Rotation of cam 67 causes the follower arm 71 to be partially rotated in a counterclockwise direction to release the double armed lever 72. Cam 67 is provided with a high portion 67a to effect the said counterclockwise rotation of the follower arm 71. The configuration of this cam is such that four cycle points after the start of its rotation, the arm 71 can be relatched in the normal position shown in Fig. 6. This relatching is effected at the fifteen point of the cycle by cam 66. Normally, the lever 72 is latched in the position shown in Fig. 6. Upon release of the lever 72 the tension of the spring blades of contacts DR2 to DR4 is sufficient to urge the free arm of the said lever to the left as viewed in Fig. 6 to ride upon cam 66, the high point of which tends to restore the lever to the normal position shown in Fig. 6. Upon energization of magnet DR, the contacts DR1 are closed by the lever 69 and upon rotation of cam 67 and release of lever 72 contacts DR2 to DR4 are closed.

Figure 11:
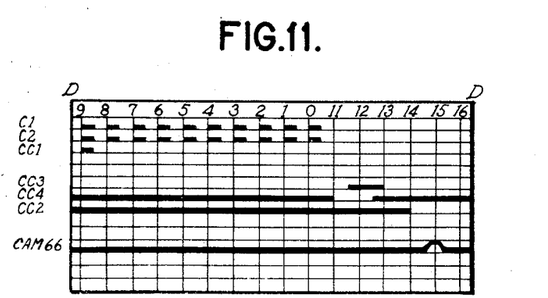
Fig. 11 is a timing chart of certain of the control elements of the machine.

The timing arrangement is such that the magnet DR is energized at a differential time in the cycle between the nine and zero points of the cycle (see Fig. 11). In the following cycle, the cam 67 will be latched by lever 69 if the said magnet is not energized during the said following cycle. At the fifteen point in the cycle in which the said magnet DR is energized, cam 66 restores lever 72 to its normal latched position, due to the engagement of the high point of cam 66 with the free end of lever 72, thereby restoring the associated contacts to the normal position (see timing of cam 66 in Fig. 11). A number of control magnets similar to magnet DR are provided for controlling similar cams and contacts and are identified in the circuit diagram as the group of magnets DR, DG, DB and DX for controlling the associated contacts which will be referred to later on.

The gear 52 (Fig. 3) is arranged to cooperate with gears 75 and 76, the former rotatably mounted on shaft 77 and the latter fixedly mounted on shaft 78, so that the shaft 78 is rotated continuously by the described driving connections. The gear 76 is in constant mesh with gear 79 which is pinned to shaft 80. The shaft 78 is the accumulator drive shaft, shaft 77 is the accumulator reset shaft, and shaft 80 is a drive shaft for the data storing units.

*Data accumulating means*

Figure 8:
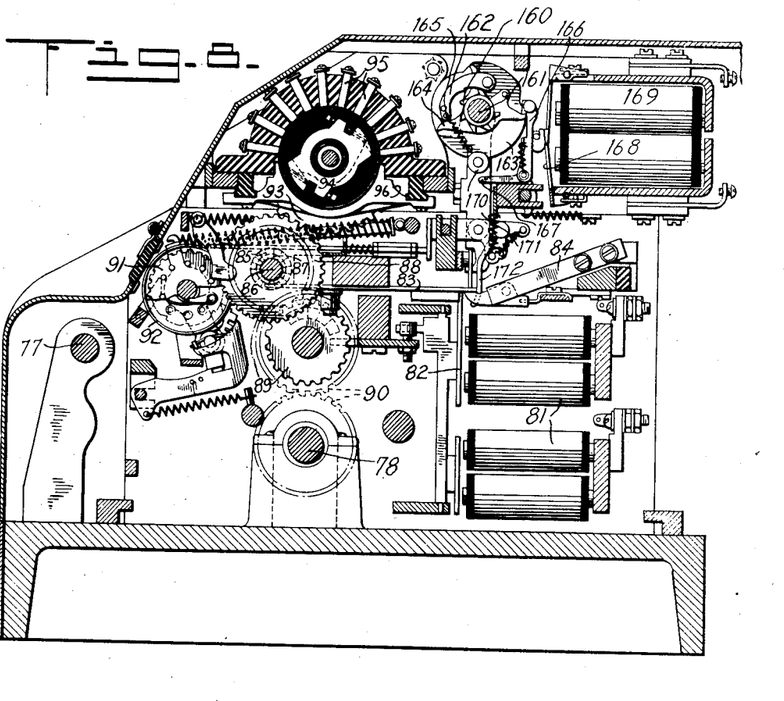
Fig. 8 is a sectional view of the accumulating means.

Referring now to Fig. 8, the operation of the data accumulating means will be briefly described. This unit is well known in the art and requires no detailed description; for a detailed description, reference may be made to U. S. Patent 1,976,617. The adding control mechanism is as follows: magnet 81 may be energized at differential times during the sensing cycle of the machine, depending upon the timed interval a control spot is sensed on the film record. Energization of the magnet attracts the armature 82 to permit displacement of the lever 83, by means of a leaf spring 84, causing the clutching member 85 slidably mounted on the shaft 86 to engage the member 87 integral with the gear 88 which is rotatably mounted on shaft 86. Gear 88, when thus coupled to shaft 86, is rotated thereby due to the gearing thereto from the shaft 78 generally indicated 89 and 90. Rotation of gear 88 causes the rotation of gear 91 to effect displacement of the accumulator index wheel 92. Also driven by gear 88 is a gear 93 which is displaced in the same manner as index wheel 92. The ratio of gears 91 and 93 is one to two so that the latter will turn through half a revolution for each revolution of the former gear. Carried by and insulated from gear 93 is a pair of electrically connected brushes 94, one of which cooperates successively with the conducting segments 95 while the other cooperates with an arcuate conducting strip 96. The relationship of the parts is such that when the index wheel 92 is in its zero position, one of the brushes 94 is in contact with the zero segment and the other is in contact with the conducting strip, thus forming an electrical connection between the two. The positioning of the said brushes provides a concurrent electrical readout mechanism for controlling total printing operations as is well known in the art.

The control spots are disposed on the film record in such a manner, and the film feeding and accumulator means are operated in such timed relationship that, for example, when a control spot is sensed at the "9" position, indicated on the film, an impulse is initiated at that time which can be directed to the control magnet 81 to cause the clutching member 85 to be tripped to rotate the index wheel 92 and brushes 94 nine steps before a declutching operation is effected by control elements of the machine.

The subtracting control mechanism will now be described briefly. Subtracting in the present machine is of the type known in the art as direct subtraction, that is, it is distinguishable from statistical machines in which the amount to be entered is first converted into its complement and then additively entered by the adding mechanism. In the operation of the present accumulating means, the entry of the nines complement of a number to be subtracted is effected by initially tripping all the adding control magnets 81 as though to add nines in each position and permitting the control spots to effect declutching of the adding mechanism in accordance with the differential positioning of the control spots. This will result in addition of the nines complement of the number. The elusive one is added into the units order of the accumulator independently to change thereby the nines complement to a tens complement. A plurality of clutch elements 160, one for each denominational order position, are provided and secured to shaft 161 which is rotated by suitable driving connections so that the said shaft rotates two revolutions for one revolution of shaft 86. An individual clutching dog 162 pivotally mounted on cam 163 (freely mounted on shaft 161) cooperates with each clutch element 160; also freely mounted on said shaft is a triple armed member 164, one of the arms of which engages a pin 165 secured to the free end of dog 162 to hold the latter out of engagement with the driving clutch element 160. Each of the arms of member 164 cooperates in turn with a pawl 166 mounted on the pivoted clutch member 167. The associated pivoted armature 168 of magnet 169 is effective upon energization of the magnet to rock the member 167 to release the armed member 164 thereby permitting engagement of dog 162 with the clutch element 160. Cam 163 will thus be driven until the next arm of member 164 is engaged by the pawl 166, which then causes disengagement of the clutch and interruption of further movement of the cam.

Upon movement of the said cam, the higher concentric portion thereof depresses roller 170 and with it the slider element 171 which engages bell crank 172 to move arm 83 in a declutching direction at a time determined by the time of energization of magnet 169.

Figure 9:
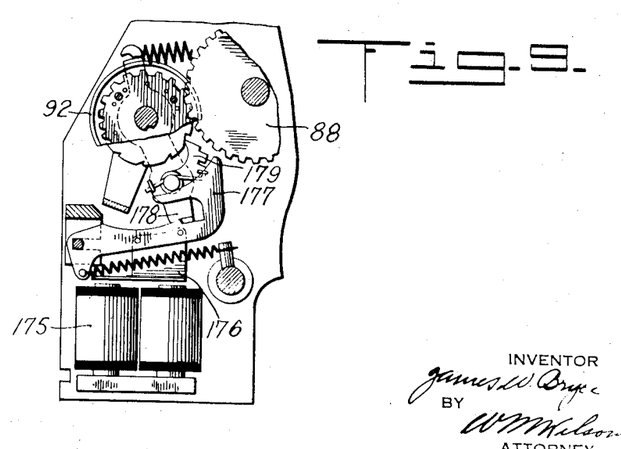
Fig. 9 is a detail view of the units order of the accumulating means, showing the mechanism for entering the elusive one.

The mechanism by means of which the elusive one is entered into the accumulating means is illustrated in Fig. 9 and is fully disclosed in the aforementioned patent. The units order of the accumulator has associated therewith a magnet 175, the armature 176 of which is secured to the carry lever latch 177 of the units order so that energization of the said magnet is effective to trip the units carrying arm 178, whereby during the carrying period of the machine cycle the pawl 179 associated with the units order advances the units wheel one step. For further detailed description of the accumulator operations such as denominational order transfer, restoration of the clutch elements and magnet armatures to normal position and resetting of the accumulator mechanism reference should be made to the aforementioned patent.

The resetting mechanism is shown to be controlled by the reset magnet 97 (Fig. 3) which when energized attracts the armature 98 to release the pawl 99 and member 100, upon which the said pawl is pivotally mounted. The released pawl then engages the clutch member 101 which is pinned to the gear 75 to effect rotation of the member 100 and shaft 77 to which the member 100 is secured thereby causing the resetting of the index wheels 92 and brushes 94 to the normal zero position as described in the said patent.

*Data storing means*

Figure 10:
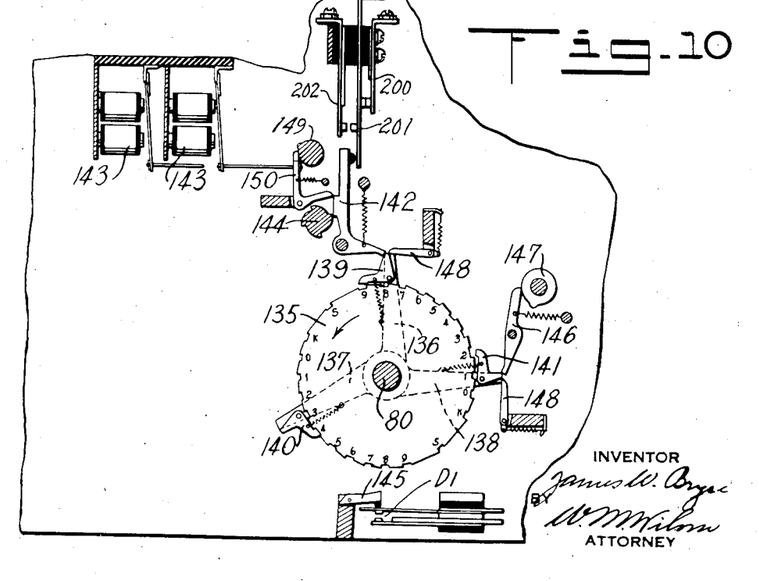
Fig. 10 is a diagrammatic view of the data showing means.

Referring now to Fig. 10, the data storing means will be described briefly, and for a detailed description of this mechanism reference should be made to U. S. Patent 1,486,149. Secured to shaft 80 (which is driven at a definite rate relative to the movement of the film) is a cycle wheel 135 (an individual wheel is provided for each row or column of control spots) having two sets of notches, each corresponding to the positions of the control spots in any given row or column of the film record, and the wheel makes one complete revolution during the period required to advance two consecutive frames or film records past the analyzing station.

On the shaft 80 are loosely mounted three arms 136, 137 and 138 to each of which is pivoted a spring actuated dog 139, 140 and 141, one end of which fits into any one of the notches in the wheel 135, and the other end projects radially outward along the arm. Assuming, for the moment, that dog 139 is in engagement with a notch in the wheel and has been brought by the movement of the latter into engagement with the lever 142 while in its latched position, it is seen that the dog is thrown out of engagement with said wheel and halted in the position indicated in Fig. 10.

The movement of the parts is so timed that at the time a control spot of given value is passing the analyzing station to effect energization of the magnets 143, a notch in wheel 135 of corresponding value will be under the dog 139. The energization of the said magnet will, therefore, permit the engagement of the dog with the notch in the wheel 135 which corresponds to the value of the then passing control spot on the film record. If no control spot occurs in a particular column of a given film record, the K notch of the related wheel 135 will be engaged by the dog under conditions to be referred to later. After engagement, the arm 136 is carried in the direction shown by the arrow and moves in unison with the wheel.

A cam wheel 144 is rotated by suitable gearing (not shown) and has a number of teeth or points which knock back the lever 142 and relatch it before the next notch has come into position. Following the locked dog in its travel with the wheel 135, it reaches at a given time the contacts D1 and the end of the arm 136 engages a lever 145 to close the said contacts. The time at which the contacts D1 are thus closed is identical to the time at which the analyzing station senses the index point position of the next record corresponding to the notch in which the dog 140 is engaged. The arm 136 being still locked by its dog continues its movement to the point, at which dog 141 is shown in the figure, where it encounters a latch lever 146 and is thrown out of engagement with the wheel. Here it rests until a cam 147 (rotated by suitable gearing not shown) unlatches lever 146 and allows the said dog to engage with an S notch in the wheel 135, from which it is again unlocked by the lever 142.

Considering now the other arms 137 and 138 and their dogs 140 and 141, these go through the same operations as described for arm 136, but successively, that is to say, while dog 139 is unlocked and stationary, the arm 137 is being carried down to the contacts D1, and the dog 141 is being carried to the latch 146 where it will rest until the S notch on the wheel comes under it, when it is tripped by the cam 147. Associated with the levers 142 and 146 are lock latches 148 which engage the arms after they have been freed from the wheel and prevent any backward movement of the same. If no control spot is in a given column, the corresponding magnet 143 will not be energized and under these conditions the uppermost dog indicated in the figure by reference character 139 must be released to engage the K notch. This is effected by knock-off cam 149 (rotated by any suitable gearing) so that the high point engages the latch lever 150 and withdraws it from engagement with the lever 142, once near the end of each cycle.

A group of transfer contacts comprising arms 200, 201, and 202 is mounted on a stationary insulating support 203. The central arm 201 is held against the arm 200 by the lever 142, as long as the latter remains latched, but moves by its own spring force out of contact with arm 200 and into contact with arm 202, when the lever 142 is released by its latch 150. These contacts are concerned with automatic group control, as will be explained presently.

*Operation of the machine*

Figure 12A:
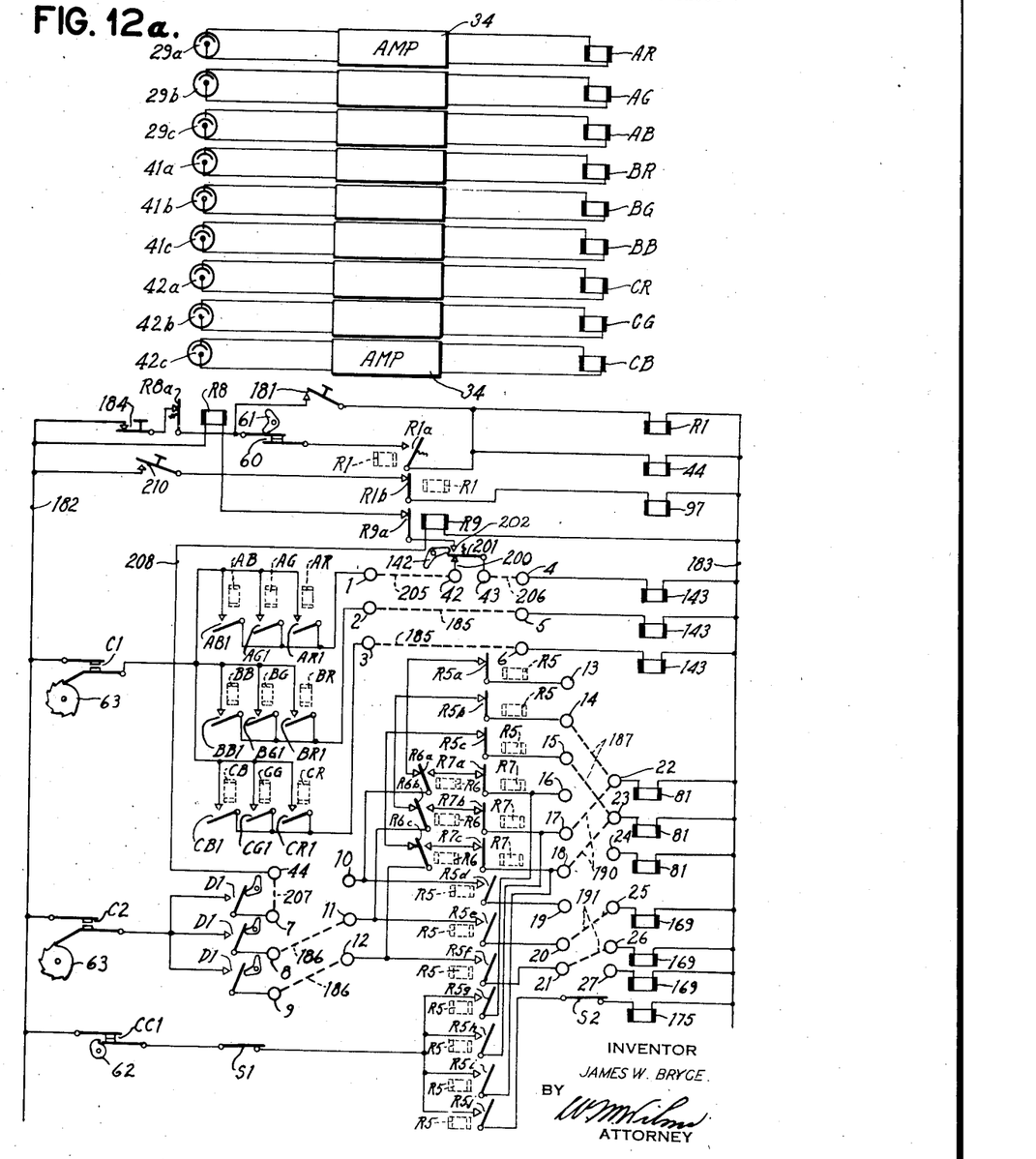
Figs. 12a and 12b taken together comprise a wiring diagram of the circuits of the machine.
Figure 12B:
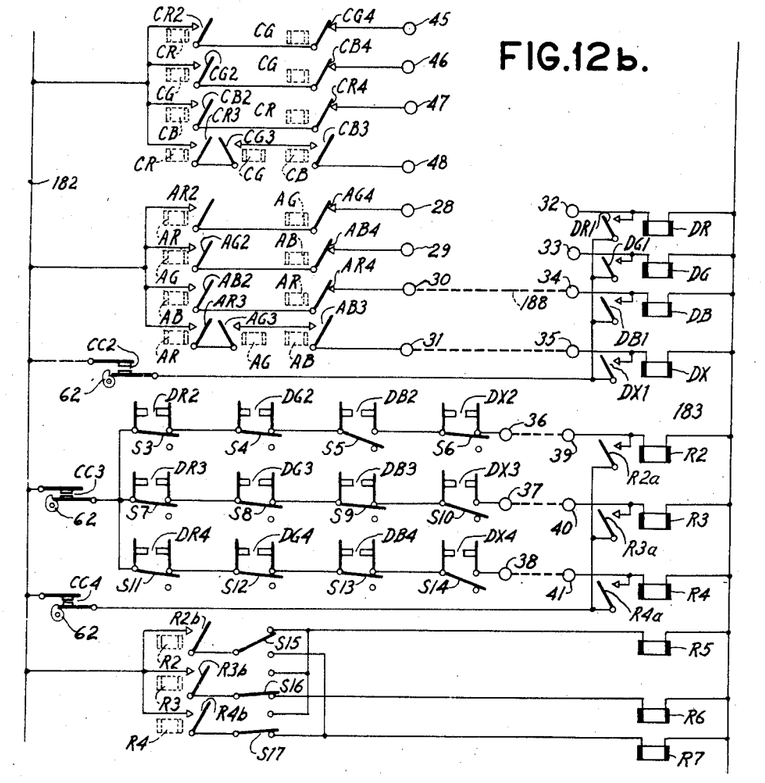

Referring now to Figs. 12a and 12b, the description of the operation of the machine will be given. Assume, for example, that it is desired to control the accumulator additively whenever the colors of the data designations on the film records are red or green, and to control the accumulator subtractively whenever the color of the data designations is blue and to eliminate any statistical operations whenever the color of the designations is black. It will be further assumed, in this first example, that the color control is going to be effected by the units order of the class data designations 21. For this type of operation the machine is connected by the plug connections as indicated in Fig. 12a and the switches S1 to S17 are positioned as shown. Since, in the instant illustration only a single analyzing station is used, it is necessary to store the amount data for a machine cycle until the entry control means can be conditioned to cause the amount to be entered additively or subtractively, or to be eliminated. In one cycle the data designations are sensed, their values are stored, and then the entry control means are conditioned according to the color of the data designation chosen for entry control. In the next cycle, while the next record is being sensed, the stored amount values are entered in the accumulator and the stored class number is compared with the sensed class number of the next record.

In determining the color of the class data on successive film records, it is evident that, if all of the color spots on a film frame are alike, only one of the spots need be used for color control and provision is made for transfer of the color control from one column to another. The units order of the class data is effective to control the conditioning of the photocells 29a to 29c and the amount data is effective to control the conditioning of the photocells 41a to 41c and 42a to 42c. Thus, in this first example the photocells 29a to 29c exercise both a group control function and an entry control function. The control record to be analyzed in this example is the one shown in Fig. 1. The film is fed downward and therefore the bottom record *e* will be sensed first. The data designations of this record are red.

Depression of the start key closes the contacts 181 to complete a circuit from conductor 182 to contacts 184 of the stop key, normally closed contacts R8a, said contacts 181 and coil of relay R1 to conductor 183 energizing said relay. A holding circuit is then established for said relay from conductor 182 to contacts 184, contacts R8a, film controlled contacts 60 (now closed), contacts R1a to coil of the relay. The said circuits connected to conductor 182 are also extended to the film feed control magnet 44 to energize the said magnet and effect feeding of the film records past the analyzing station. Contacts R1b open, disabling the circuit of the reset magnet 97.

Upon sensing of the red control spots, the light rays are prevented from impinging upon the photocells 29a, 41a and 42a at the differential times the said spots are presented to the sensing means, thereby conditioning the associated amplifiers so that current flows in the output circuits thereof at such times and effecting energization of the relays AR, BR and CR.

The following circuits are established immediately: from conductor 182 to contacts C1, contacts BR1 and CR1, conductors 185 to the related control magnets 143 of the storage means, and conductor 183 energizing said magnets; also a parallel circuit through contacts AR1, plug wire 205, contacts 200 and 201, plug wire 206, the related magnet 143 to conductor 183. Energization of the magnets 143 causes the corresponding dogs 139 to be released so that they engage the notches in wheels 135 to correspond to the values of the data sensed. Also, the rocking of lever 142 in the units column of the class data allows arm 201 to transfer, completing the following circuit: from wire 182, coil of stop relay R8, normally closed contacts R9a, contacts 202 and 201, plug wire 206 and magnet 143 to wire 183, energizing said relay and holding said magnet until the lever 142 is kicked back by cam 144. The contacts R8a open, breaking the circuit of relay R1 and feed clutch magnet 44, with the result that the film feed mechanism latches up at the end of the first cycle.

The contacts AR2 and CR2 (Fig. 12b) also close, but with no effect, because of the way in which the machine is plugged. The closure of contacts AR3 and CR3 is likewise without effect. Thus, the entry control means, to be referred to presently, is left in its normal adding condition, as will appear presently.

The second machine cycle is started by pressing the start key to close the contacts 181, with the same results as previously described. In this cycle the downwardly moving arms locked in differential positions to the related wheels 135 pertaining to the amount data are effective to operate the contacts D1 at differential times corresponding to the data stored in the said wheels. As each pair of contacts D1 pertaining to the amount data is operated, a circuit is completed from conductor 182 to cam contacts C2, contacts D1, conductors 186, normal contacts R6b and R6c, contacts R5b and R5c, conductors 187 to the adding control magnets 81 and conductor 183, energizing the said magnets at the differential times the said contacts D1 are closed to effect entry of the amount data additively in the accumulator.

As the contacts D1 pertaining to the class data are closed at the 6 index point in the cycle, a circuit is completed from wire 182, through contacts C2 and D1, plug wire 207, wire 208 and relay R9 to wire 183, energizing said relay. In the example, the class number of the second record to be sensed, the record d is again 6; therefore, at the time the lever 142 is rocked and allows the contact arm 201 to touch the contact 202, the contacts R9a are open and the stop relay R8 remains deenergized. The cam 144 relatches the lever 142 and transfers the contact arm 201 back to its position of rest before the contacts D1 open and deenergize relay R9.

During the second cycle the amount values and class number are stored in the wheels 135 as in the first cycle, while the entry control means are left in their normal additive condition, as before. The record c sensed on the third cycle, is blue, hence the photocells 29c, 41c, and 42c are conditioned to energize the relays AB, BB, and CB. The AB1, BB1 and CB1 contacts cause the storing control magnets 143 to be energized as described before, thereby storing the data so that the D1 contacts are operated accordingly one cycle later. Since the class number is still 6, the stop relay R8 remains unenergized. Closure of contacts AB2, at the time the blue control spot 21 of record c is sensed, completes a circuit from conductor 182 to contacts AB2 and AR4, conductor 188 to coil of magnet DB and conductor 183, energizing said magnet. A holding circuit is immediately established for said magnet by means of contacts CC2 and DB1, which maintains the magnet energized almost the entire machine cycle.

Now upon energization of magnet DB, the corresponding cam 67 is released to close contacts DB2 to DB4. Due to the closure of contacts DB2 and upon closing of cam contacts CC3 shortly before the twelfth point in the cycle (this is the cycle in which the control spots of record c are sensed), a circuit is completed from conductor 182 to contacts CC3, switches S3 and S4, contacts DB2, switch S6, conductor 189 to coil of relay R2 and conductor 183. A holding circuit for the said relay is established shortly after the twelfth point in the said cycle by means of cam contacts CC4 and contacts R2a. The relay R2 is maintained energized until after the sensing period of the following cycle. Upon closure of contacts R2b, a circuit is completed from conductor 182 to said contacts, switch S15 and coil of entry control relay R5 to conductor 183, energizing said relay. Opening of the entry control contacts R5a to R5c prevents the stored data from being entered additively into the accumulator. However, due to closure of entry control contacts R5d to R5j, the stored data (corresponding to the blue control spots) is now entered subtractively into the said accumulator, by means of the following circuits: from conductor 182 to contacts CC1, switch S1, contacts R5h and R5i, conductors 190 to the add control magnets and conductor 183, energizing said magnets at the beginning of the cycle as if nines are to be added in the accumulator. The elusive one magnet 175 is also energized at this time by virtue of the closed contacts R5j. The subtract control magnets 169 are energized at differential times to effect declutching operations of the type described by the circuits from conductor 182, to contacts C2, contacts D1, conductors 186, contacts R5e and R5f, conductors 191, magnets 169 to conductor 183. Thus, it is seen that the data contained on the film records in blue color is entered subtractively in the accumulating means.

The record b is green; therefore, on the fourth machine cycle the photocells 29b, 41b, and 42b are conditioned so that at the times the green control spots are sensed, the associated amplifiers are conditioned so that current flows in the output circuits thereof to effect energization of relays AG, BG, and CG. Closure of contacts BG1 and CG1 establishes circuits at the times the amount spots 22 are detected from conductor 182 to contacts C1, said contacts BG1 and CG1, conductors 185 to magnets 143 and conductor 183, energizing the said magnets to store the sensed data and effect control of the associated D1 contacts one cycle later to control the add control magnets 81. This circuit is exactly like the control circuit just traced for controlling the add magnets.

The contacts AG1 complete a circuit like the one previously traced through the contacts 200 and 201 to the upper storage control magnet 143. This occurs at the 5 index point in the cycle, at a time when the relay R9 is deenergized, because the class number of the previous record was 6. Hence, the transfer of contact arm 201 to contact 202 completes the previously described circuit through the coil of the stop relay R8, which stops the record feed at the end of the cycle and leaves relay R1 deenergized. The contacts R1b close, preparing a circuit which can be completed by operating the reset key to close contacts 210, the circuit extending from wire 182 through contacts 210, R1b, and reset magnet 97 to wire 183. The energization of the reset magnet causes the machine to go through total readout and resetting operations, as described in Patent 1,976,617.

The fifth cycle is initiated by operating the start key to close contacts 181. During this cycle a black record $a$ is analyzed and, since a black spot cuts off all the light, all of the groups of photocells 29a to 29c, 41a to 42c, and 42a to 42c are conditioned at differential times to cause their related relays AR to AB, BR to BB, and CR to CB to be energized at times which will cause values to be stored in accordance with the control spots 21 and 22. Closure of the contacts AR3, AG3, and AB3 establishes a circuit from conductor 182 to the coil of magnet DX (similar to magnet DR in Fig. 6), energizing said magnet and establishing a holding circuit therefor through contacts DX1 and CC2, thus effecting release of its cam 67 to close contacts DX2 to DX4. Through contacts DX3 a circuit from conductor 182 is completed through contacts CC3, switches S7, S8 and S9, and contacts DX3 to the coil of relay R3, energizing said relay and establishing a holding circuit therefor through contacts R3a and CC4. Also upon closure of contacts DX4 relay R4 is energized and a holding circuit is completed therefor through contacts R4a and CC4. The said relays R3 and R4 are maintained energized during the entry part of the cycle following the cycle in which said black control spots are sensed.

Therefore, it is seen that relays R6 and R7 are energized for the same period since contacts R3b and R4b are now closed. Due to this condition, entry control contacts R6a to R6c are transferred and contacts R7a to R7c are opened, thus preventing any circuits from being completed by the contacts D1 of the data storing units and thereby preventing any entry in the accumulator.

Figure 13:
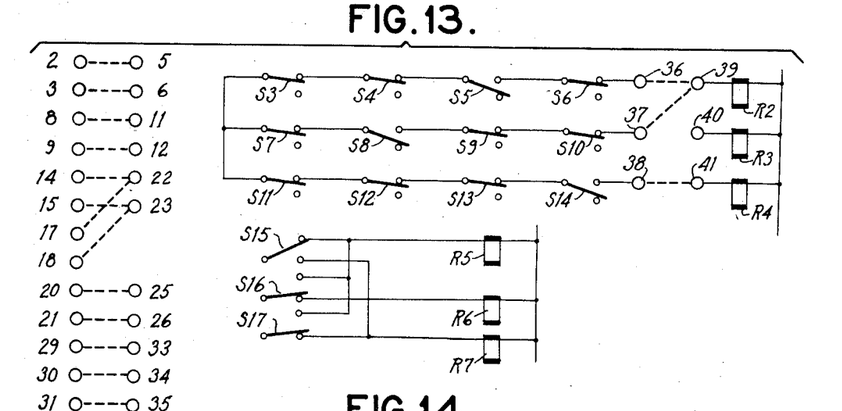
Figs. 13, 14, 15 and 16 are four diagrams of plug connections and switch positions for four different kinds of operation of the machine.

The plug connections and switch positions for a different kind of operation are shown in Fig. 13. In this case the data of records having red entry control designations will be additively entered in the accumulator, the data of records having blue or green entry control designations will be subtractively entered in the accumulator, and the data of records having black entry control designations will not be entered. The plug connections and switch positions are the same as in Figs. 12a and 12b, with the exceptions now to be mentioned. A plug wire is added between the plug hubs 29 and 33. The switch S8 is opened and the switch S10 is closed. The plug hub 37 is connected to the plug hub 39 instead of 40. When green entry control designations are sensed by the photocell 29b, the relay AG will be energized and the contacts AG2 will be closed, completing a circuit from line wire 182, through said contacts AG2, contacts AB4, the connector between plug hubs 29 and 33, and relay DG, to line wire 183, energizing said relay. A holding circuit is completed through contacts CC2 and DG1. Contacts DG2 to DG4 are closed, the contacts DG3 completing a circuit from line wire 182, through contacts CC3, switch S7, contacts DG3, switches S9 and S10, plug hub 37, through the connector to the plug hub 39, and through relay R2 to line wire 183, energizing said relay. The closure of contacts R2b energizes relay R5, which sets up the circuits for subtractive entry in the manner previously described.

Figure 14:
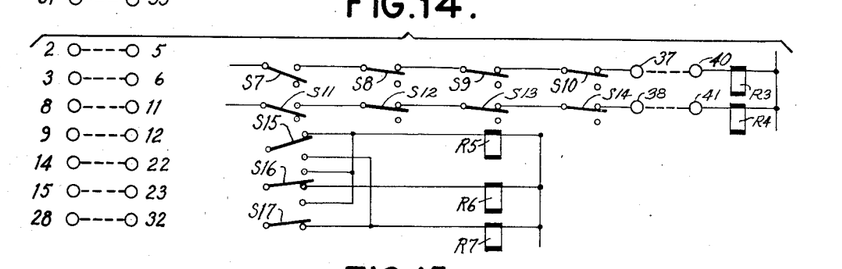

If it is desired to enter the data of all records except those having red entry control designations, the plug connections and switch positions may be as shown in Fig. 14. Since no subtractive entry is to be provided for, the connectors 190 and 191 of Fig. 12a are not required. Only a single connector 188 is used between the plug hubs 28 and 32. Thus, the normal position of the entry control switches R5a to R5j, R6a to R6c and R7a to R7c will remain undisturbed, unless a red entry control designation is sensed. In the latter case, the relay AR will be energized, closing its contacts AR2 and energizing relay DR through an obvious circuit. The contacts DR2 to DR4 will be closed, but only contacts DR3 and DR4 bridging the open switches S7 and S11 will be effective. These will complete a circuit from line wire 182, through contacts CC3, DR3 and DR4, switches S8, S9 and S10, and switches S12, S13 and S14, the connectors from plug hubs 37 and 38, to plug hubs 40 and 41, and relays R3 and R4, to line wire 183, energizing said relays. Closure of contacts R3b and R4b will energize relays R6 and R7 in the manner previously described and contacts R6a to R6c will be transferred and contacts R7a—R7c will be opened. Thus, no circuits will be completed through the supervisory switches and the item having the red entry control designation will not be entered. Those having entry control designations of any other color will not disturb the normal position of the supervisory switches, and their data will be entered under control of the circuits including normal switches R6b, R6c and R5a, R5b, and the connectors 187.

Figure 15:
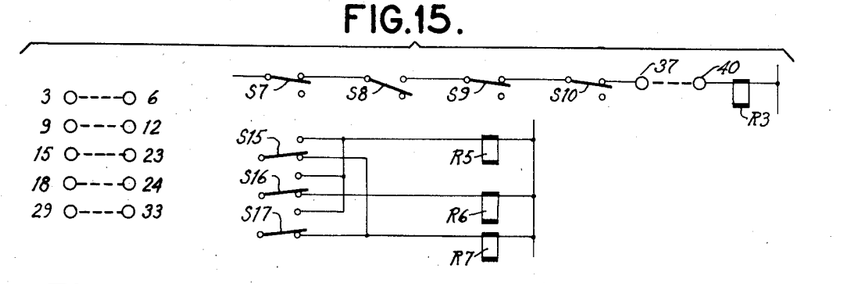

If it is desired to distribute items of different classes, identified by differently colored entry control designations, into different accumulators of the tabulating machine, the plugging and switch positions may be as shown in Fig. 15. In this case two different accumulators are assumed to be represented by the two accumulator magnets 81 connected, respectively, to the plug hubs 23 and 24. Conforming to the showing of only one order of each accumulator, there is only one connection 185 between the plug hubs 3 and 6 and one connection 186 between the plug hubs 9 and 12. The plug hubs 15 and 18 are connected, respectively, to plug hubs 23 and 24. A single connector 188 joins plug hubs 29 and 33. The switch S8 is open while the switches S7, S9 and S10 are closed. Items having a green entry control designation will be added in the lower accumulator, while all other items will be added in the upper accumulator. This is because the supervisory switches in normal position conduct impulses from line wire 182, through contacts C2 and D1, plug hubs 9 and 12, normal switches R6c and R5c, from plug hub 15 to plug hub 23 and the upper accumulator magnet 81. When a green entry control designation is sensed, the relay DG is energized, the contacts DG3 are closed, energizing relay R3, and the contacts R3b of the latter complete a circuit to energize relay R6. Thus, impulses from contacts C2 will pass through transferred switch R6c, switch R7c, now closed, to plug hub 18, thence to plug hub 24 and the lower accumulator magnet 81.

Figure 16:
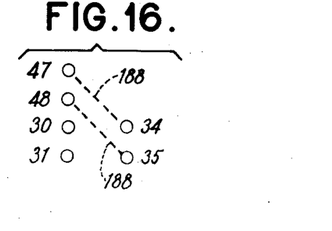

If it is desired to control the entries by the color of the data designation in the units column of the amount data, the machine may be plugged as shown in Figs. 12a and 12b, except for the alterations shown in Fig. 16. These consist simply in shifting the plug wires 188 from plug hubs 30 and 31 up to plug hubs 47 and 48, respectively. The machine will then operate in exactly the same manner as in the first example described, except that the color control will be effected through the photocells 42a to 42c and their related relays CR, CG and CB.

Many other possibilities for carrying out various kinds of tabulating operations will suggest themselves to those skilled in the art, the ones particularly described being merely illustrative.

The novel control record described hereinabove is claimed in copending application Serial No. 282,209, filed June 30, 1939, now Patent 2,268,499.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine for tabulating data from a plurality of individual records whereon the data is represented by sensible indicia distinctively positioned in different fields to represent different values, at least one of the indicia of each record having one of a plurality of predetermined colors, data accumulating means, record sensing means adapted to sense the distinctive positions of the indicia and including means to detect the color of said colored indicium, means controlled by said record sensing means for entering data in said accumulating means, said data entering means being capable of either additive or subtractive entry, and entry control means controlled by said color detecting means for varying the operation of said data entering means to cause either additive or subtractive entry of the data in the accumulator.

2. In a machine for tabulating data from a plurality of individual records whereon the data is represented by sensible indicia distinctively positioned in different fields to represent different values, at least one of the indicia of each record having one of a plurality of predetermined colors, data accumulating means, record sensing means adapted to sense the distinctive positions of the indicia and including means to detect the color of said colored indicium, means controlled by said record sensing means for entering data in said accumulating means, and entry control means controlled by said color detecting means for rendering said record sensing means effective or ineffective to control entry in said accumulator of an amount sensed from a particular record, in dependence upon the color of the colored indicium of said record.

3. In a machine for tabulating data from individual records, whereon the data is represented by designations distinctively positioned to indicate value, at least one of the designations being distinctively colored, data accumulating means, record sensing means including means to detect the color of said distinctively colored designation, means controlled by said record sensing means, in dependence upon the positions of the data designations, for entering the values of the data in said accumulating means, and entry control means controlling said entering means and variably controlled by said color detecting means in dependence upon the color detected thereby.

4. In a machine for tabulating data from records having distinctively positioned class and amount data designations, at least said class data designations being distinctively colored, means to sense said data designations including means to detect the position of all of the data designations and means to detect the color of the class data designations, accumulating means, means controlled by the amount data sensing means, in dependence upon the position of the amount data designations, for entering amounts in said accumulating means, entry control means controlling said entering means and variably controlled by said color detecting means, in dependence upon the color of the class data designations, and automatic group control means controlled by the sensing means which detects the position of the class data designations, said automatic group control means comprising means to compare the positions of class data designations on successive pairs of records.

5. In a machine for tabulating data from records having distinctively positioned data designations in different columns, including a color control column, at least the designations in said color control column being distinctively colored to represent different entry control operations, means to feed the records longitudinally of the columns, means including light responsive devices to sense the columns as the records are fed, the sensing means for said color control column comprising a plurality of light responsive devices and means for rendering the same selectively responsive to differently colored data designations, differential control means pertaining to each column, the differential control means pertaining to said color control column including means adapted to be operated by each one of the light responsive devices pertaining to said column, accumulating means, data entering means including a plurality of means controlled by respective ones of said differential control means, for controlling corresponding orders of said accumulating means, and entry control means governing the operation of said entering means, including a plurality of devices selectively operable, under control of said light responsive devices, in dependence upon which of said light responsive devices pertaining to said color control column responds to a data designation.

6. In a machine for tabulating data from individual records each including a data designation distinctively positioned to represent a value and distinctively colored to represent a particular kind of entry, means for sensing said data designation, including a plurality of light responsive devices and means to render the same selectively responsive to differently colored data designations, data accumulating means, means for entering values therein controlled differentially by any one of said light responsive devices, in dependence upon the position of the data designation, and a plurality of entry control devices controlling said entering means and selectively controlled by said light responsive devices.

7. In a machine for tabulating data from records bearing data designations, at least one data designation on each record being distinctively colored and all of the data designations being distinctively positioned to represent different values, means to sense the data designations including means to detect the color of said distinctively colored data designation, said last means being differently responsive to differently colored data designations, accumulating means, means controlled by said sensing means in accordance with the position of data designations for entering amounts in said accumulating means in either of two opposite senses, entry control means governing the operation of said entering means and normally conditioned to cause amounts to be entered in one sense, and means controlled by said color detecting means and operative upon detection of a data designation of a particular color to condition said entry control means to cause said entering means to enter an amount in the opposite sense.

JAMES W. BRYCE.

REFERENCES CITED

The following references are of record in the file of this patent:

UNITED STATES PATENTS

| Number | Name | Date |
| --- | --- | --- |
| 2,294,734 | Bryce | Sept. 1, 1942 |
| 2,325,941 | Dickinson | Aug. 3, 1943 |
| 2,254,932 | Bryce | Sept. 2, 1941 |
| 2,268,498 | Bryce | Dec. 30, 1941 |